ELECTRICAL COMPONENT ASSEMBLY WITH IMPROVED STRUT FASTENING MEANS AND METHOD OF MANUFACTURE THEREOF

Filed July 8, 1965

Inventor
Kurt Stephan
By - Pendleton, Neuman, Seibold & Williams
Attorneys

United States Patent Office 3,364,396
Patented Jan. 16, 1968

3,364,396

ELECTRICAL COMPONENT ASSEMBLY WITH IMPROVED STRUT FASTENING MEANS AND METHOD OF MANUFACTURE THEREOF

Kurt Stephan, Thiensville, Wis., assignor to Globe-Union Inc., Milwaukee, Wis., a corporation of Delaware
Filed July 8, 1965, Ser. No. 470,438
14 Claims. (Cl. 317—101)

ABSTRACT OF THE DISCLOSURE

A novel assembly for components such as rotary electrical switches where a plurality of similar flat components are supported in spaced generally parallel relationship on two or more struts. Each strut has a noncircular cross-section and circumferential grooves to mate with apertures in the components whereby rotation of the struts locks the components in place thereon.

The present invention relates in general to an improved electrical component assembly and, more specifically, to an improved rotary switch assembly and the method of manufacture thereof.

Rotary switches having a plurality of layers or wafers assembled in stacked relationship on a common shaft are quite common in modern electronic equipment. Conventionally, each switch section has an annular insulating support with a plurality of conductive poles mounted circumferentially thereon. A centrally mounted rotary element carrying an annular metallic wiper completes circuits between the various poles in selected combinations as a result of the particular angular position of the rotary member.

The stacked rotary switch in most general use today is assembled by the use of two or more long bolts passing through aligned apertures in the various wafers with cylindrical spacers carried by the bolt to maintain the various wafers in generally parallel spaced relationship. Such an assembly involves many parts which are expensive to manufacture and difficult and expensive to assemble. Furthermore, the bolts and cylindrical spacers introduce electrical interference if they are not carefully electrically interconnected by auxiliary means. Also, the bolts and spacers are bulky and cumbersome, increasing the overall size of the rotary switch assembly.

It is therefore a primary object of the present invention to provide a new and improved electrical component assembly. More specifically, it is an object to provide a new and improved rotary switch assembly. In this connection, it is an object to provide a new and improved method for the manufacture and assembly of electrical component assemblies and specifically a rotary switch assembly including a plurality of multiple pole rotary switches in a single aligned unit.

A more general object of the present invention is to provide a new and improved electrical component assembly which requires a minimum number of parts. Another more general object is to provide such an assembly having enhanced rigidity with a reduced number of parts. In this connection, it is an object to provide a new and improved rotary switch assembly having enhanced physical appearance and requiring less space for mounting. Moreover, it is an object to provide such an assembly unit resulting from the requirements for fewer parts and less labor.

Other objects and advantages of the present invention will become apparent upon reading the attached detailed description taken in conjunction with the drawing.

In one form of this invention, a plurality of struts are provided which have at least one axially extending rib with notches formed at spaced positions along the length of each rib and a plurality of component sections are provided which have apertures formed therein corresponding in number and cross section to the struts. The struts extend through the apertures and are in rotated positions so that the ribs are not adjacent corresponding portions of the apertures and the component sections are received and supported by the struts. The ribs may be staked into the component sections so that the component sections are securely supported by the struts. The new and improved method for assembling component assemblies of this type also forms a part of this invention.

The invention will now be described with reference to the drawing, wherein.

Figures 1, 2, 3, 4, 5:
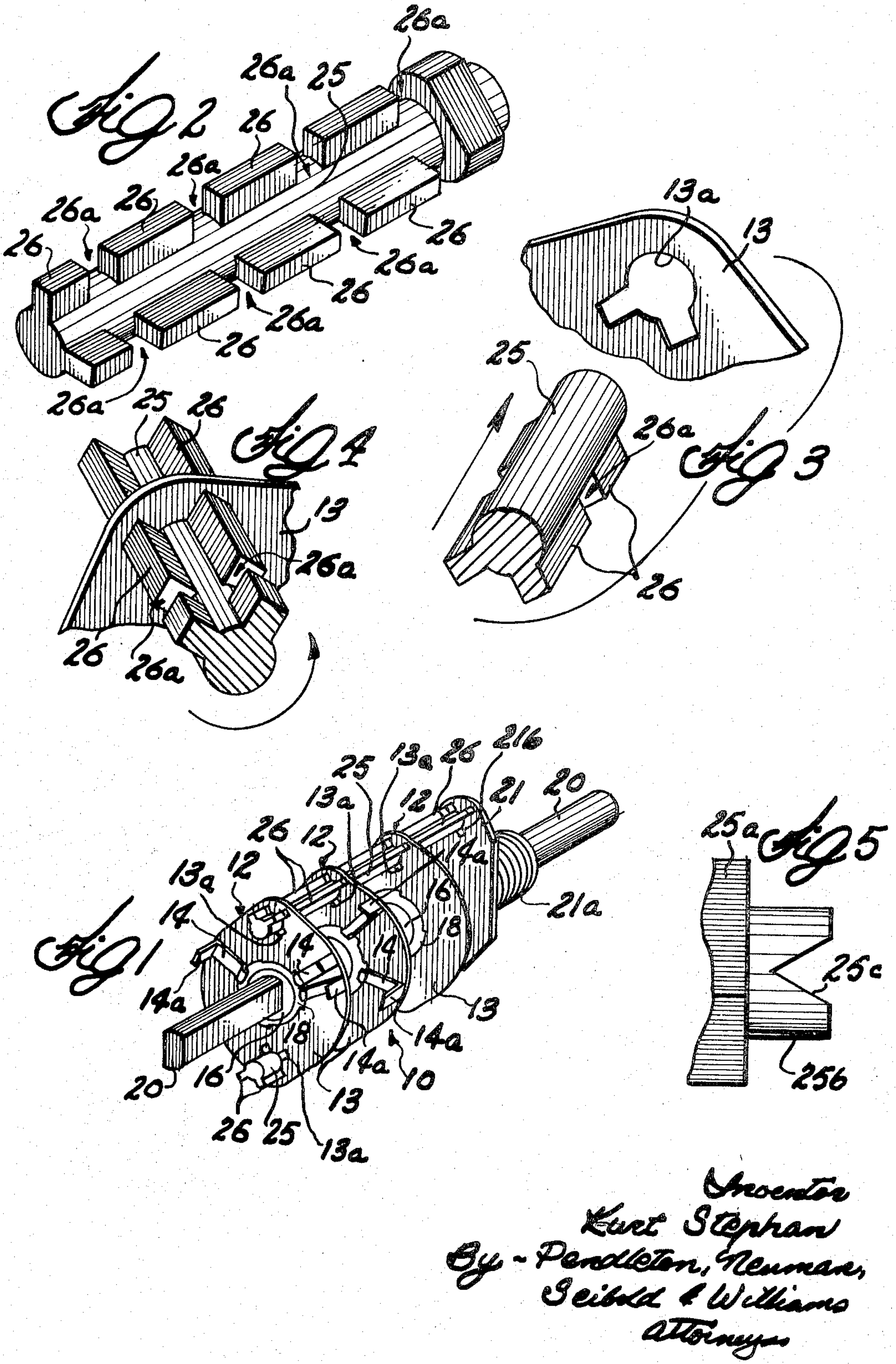
FIGURE 1 is a perspective view of a rotary switch assembly constructed in accordance with the teachings of the present invention.
FIG. 2 is an enlarged perspective view of a strut utilized in the rotary switch assembly of FIG. 1.
FIG. 3 is a perspective view illustrating how a strut is inserted into apertures within switch sections of the switch assembly shown in FIG. 1.
FIG. 4 is a perspective view showing the relative positions between a strut and a switch section for the switch assembly shown in FIG. 1.
FIG. 5 is a partial side view of a strut utilizable in the switch assembly of FIG. 1 showing a head portion which allows for readily staking the strut to a mounting plate for the switch assembly.

While the invention has been shown and will be described in some detail with reference to a particular exemplary embodiment thereof, there is no intention that it be limited to such detail. Quite to the contrary, it is intended here to embrace all modifications, alternatives, and equivalents falling within the spirit and scope of the invention as defined by the appended claims.

Referring now to the drawing and more specifically to FIG. 1, an electrical component assembly 10 is shown which is constructed in accordance with the teachings of the present invention. The component assembly is, in the illustrated embodiment, a rotary switch assembly having a plurality of aligned electrical components in the form of switch sections 12 which are to be supported in substantially parallel spaced relationship. Each switch section 12 includes a substantially annular, disc-like wafer or web 13 which is generally formed of a relatively rigid insulating material such as a fibrous sheet impregnated with phenolic. Radially extending contacts 14 of a resilient conductive material are secured to the wafers at spaced positions around the surface thereof. The contacts 14 have terminal portions **14*a* to allow for electrical connection thereof to remote circuitry. An insulating central rotary member 16 is secured in each wafer with a conductive annulus 18 secured thereto. The conductive annulus 18 has a pattern of wipers or contacts extending radially outward therefrom which engage the resilient contacts 14 to form electrical connections between selected ones of the contacts 14 at prescribed times during each revolution of the central rotary member 16. For the purpose of imparting rotational movement to the rotary portion 16, a shaft 20, which in the exemplary arrangement is shown as being manually operable, is provided which extends through apertures in the rotary members 16 and drivingly engages each rotary member. The exemplary switch assembly 10 is provided with a front mounting plate 21 which is to be supported in substantially parallel spaced relationship with the switch sections 12. The mounting plate 21 has a threaded portion 21*a* and has a centrally located bore extending therethrough through which the shaft 20 extends. In the mounting of the assembly 10 on a panel or wall, the threaded portion 21*a* and the shaft 20 are extended through an aperture in the panel and a nut is threaded onto the threaded portion 21***a* to lock the assembly in place on the panel.

In accordance with the present invention, new and improved means are provided for supporting the switch sections 12 and the mounting plate 21 in substantially parallel spaced relationship. For this purpose in the exemplary arrangement, a pair of struts 25 (FIGS. 1–4) are provided which have a main body portion substantially circular in cross section and which have a pair of axially extending ribs 26 with notches 26*a* formed at desired spaced positions along the length of the ribs. In other words, the struts are formed with alternate noncircular and circular cross-section portions which define notches or grooves between adjacent noncircular portions and various strut configurations other than that shown in FIGS. 1–4 may be used which fall within the spirit and scope of the present invention. In keeping with the invention, the wafers 13 of the switch sections 12 are provided with a pair of apertures 13*a* corresponding in cross section to the struts 25 at positions adjacent the ribs 26. The struts 25 extend through the apertures 13*a* and are disposed in rotated positions so that the ribs 26 are disposed diametrically opposite corresponding portions of the apertures 13*a* and the switch sections 12 are received and supported in the notches 26*a*. In like manner, the mounting plate 21 is provided with a pair of apertures 21*b* corresponding in cross section to the struts 25 at positions adjacent the ribs 26 and the struts extend through these apertures in like manner. The struts 25 may be suitably secured to the switch sections 12 and a mounting plate 21, such as by staking, so that a rigid switch assembly is provided.

A brief description of the method of assembling the switch assembly 10 may be helpful in understanding the present invention. Initially, a desired plurality of switch sections 12 are formed with the apertures 13*a* provided therein and a plurality of struts 25 are formed having ribs 26 with notches 26*a* formed therein at desired spaced positions. It will be apparent that an elongated rod of universal length may be provided having the axially extending ribs 26 associated therewith from which the struts 25 may be formed. To form the struts 25, notches are formed in the ribs 26 at desired spaced positions along the length thereof and the rod is then cut into a plurality of sections having desired lengths. In other words, the struts 25 may be formed during the manufacture of a switch assembly by shearing the elongated rod to meet particular dimensional requirements. In forming the switch assembly, the struts 25 are extended through the apertures 13*a* in the switch sections 12 (see FIG. 3) and through the apertures 21*b* in the mounting plate 21 until the sections 12 and the mounting plate 21 are adjacent selected notches 26*a* in the struts. The struts are then rotated relative to the sections 12 and the plate 21 a desired amount, such as 180° as shown in FIG. 4, whereat the ribs 26 are disposed diametrically opposite corresponding portions of the apertures 13*a* and 21*a*. The struts may then be staked into the sections 12 and the mounting plate 21 so that the sections and the mounting plate are securely supported thereby. The shaft 20 may then be extended through the assembly 10.

To aid in providing a secure connection between the struts 25 and the mounting plate 21 so as to prevent rotation of the struts subsequent to the formation of a switch assembly, one end of the strut 25 may be formed as shown in FIG. 5. The strut 25 is provided with an enlarged end section 25*a* which is adapted to engage one side of the mounting plate 21 and is provided with a substantially circular cross-section end portion 25*b* having a V notch 25*c* formed therein. In construction of the switch assembly 10 with such a strut end arrangement, the section 25*b* is extended through a corresponding circular aperture in the mounting plate 21. The strut may then be staked to the mounting plate and during each operation, the upper and lower sides of the section 25*b* of the strut as viewed in FIG. 5 will be pressed into locking engagement with the mounting plate 21.

In view of the foregoing, it will be seen that an electrical switch assembly has been provided which is characterized in its simplicity of construction and ease of manufacture and which readily lends itself to an automatic assembly process. While the exemplary switch assembly employs two struts 25, it will be readily apparent that a greater number of struts may be employed where necessary to increase the strength and rigidity of the switch assembly.

What is claimed is:

1. In an electrical component assembly, the combination which comprises a plurality of elongated struts, each strut having at least one axially extending rib with notches formed at spaced positions along each rib, and a plurality of electrical components supported in spaced relationship by the struts, each component having a plurality of apertures formed therein corresponding in number to the struts and each aperture corresponding in cross section to the cross section of one of the struts at a position adjacent the ribs, the struts extending through the apertures and being disposed in rotated relationship with respect thereto so that the ribs are displaced from corresponding portions of the apertures and so that the components are received in the notches and are supported by the struts.

2. In an electrical component assembly, the combination which comprises a plurality of elongated struts of non-circular cross section each having grooves formed at spaced positions therealong to define portions of substantially circular cross section, and a plurality of electrical components supported in spaced relationship by the struts, each component having a plurality of apertures formed therein corresponding in number to the struts and each aperture corresponding in cross section to the noncircular portions of the struts, the struts extending through the apertures and being disposed in rotated positions so that the components are received in the grooves and are supported by the struts.

3. In an electrical component assembly, the combination which comprises a plurality of elongated struts having alternate circular and noncircular cross-section portions so that grooves are defined between adjacent noncircular portions, and a plurality of electrical components supported in spaced relationship by the struts, each component having a plurality of apertures formed therein corresponding in number to the struts and each aperture corresponding in cross section to the noncircular portions of the struts, the struts extending through the apertures and being disposed in rotated positions so that the components are received in the grooves and are supported by the struts.

4. In an electrical component assembly, the combination which comprises a plurality of elongated struts having notches formed at spaced positions therealong, and a plurality of electrical components supported in spaced relationship by the struts, each component having a plurality of apertures formed therein corresponding in number to the struts and each aperture corresponding in cross section to the cross section of one of the struts, the struts extending through the apertures and the components being received in the notches and supported by the struts.

5. In an electrical component assembly, the combination which comprises a plurality of elongated struts, each strut having at least one axially extending rib with notches formed at spaced positions along each rib, and a plurality of electrical components supported in substantially parallel spaced relationship by the struts, each component having a plurality of apertures formed therein corresponding in number to the struts and each aperture corresponding in cross section to the cross section of one of the struts, the struts extending through the apertures and being disposed in rotated relationship with respect thereto so that the ribs are displaced from corresponding portions of the apertures and the components are received in the notches, the struts being staked into the components so that the components are securely supported thereby.

6. The assembly as recited in claim 5 wherein each electrical component is a switch section which includes an annular, disc-like web member of insulation material, conductive contact means secured to the web means, and a central rotary portion having conductive means selectively engageable with the contact means.

7. In an electrical component assembly, the combination which comprises a pair of elongated struts, each strut having a pair of axially extending ribs with notches formed at spaced positions along the length of the ribs, and a plurality of disc-like electrical components having thicknesses corresponding to the width of the notches and supported in substantially parallel spaced relationship by the struts, each component having a pair of apertures formed therein which correspond in cross section to the struts at positions adjacent the ribs, the struts extending through the apertures and being in rotated positions so that the ribs are disposed diametrically opposite corresponding portions of the apertures and so that the components are received in the notches and are supported by the struts.

8. In an electrical component assembly, the combination which comprises a plurality of elongated struts, each strut having at least one axially extending rib with notches formed at spaced positions along each rib, a plurality of electrical components supported in substantially parallel spaced relationship by the struts, each component having a plurality of apertures formed therein corresponding in number to the struts and each aperture corresponding in cross section to the cross section of one of the struts at a position adjacent the ribs, the struts extending through the apertures and being in rotated positions so that the ribs are displaced from corresponding portions of the apertures and so that the components are received in the notches and are supported by the struts, and a mounting plate disposed in substantially parallel relationship with the components and having apertures through which the struts extend, the struts being secured to the mounting plate so that the struts are not rotatable.

9. In an elecrical component assembly, the combination which comprises a plurality of elongate generally cylindrical struts, and a plurality of electrical components supported in spaced relationship on the struts, each component having a plurality of apertures formed therein corresponding in number to the struts and each aperture corresponding in cross-section to the cross-section of one of the struts, the struts having a plurality of transverse grooves of reduced cross-section, one of said grooves being aligned with each of said components, said struts being disposed in said apertures and rotated about an axis whereby said components are locked against longitudinal movement on said studs.

10. In an electrical component assembly, the combination which comprises an elongate generally cylindrical strut having a noncircular cross-section, an electrical component having a noncircular aperture therein corresponding to the cross-section of said strut and receiving said strut, said strut having a transverse groove therein generally aligned with said component, and said strut being in a rotational position about its axis such that said component is locked in said groove.

11. In an electrical component assembly, the combination which comprises a plurality of elongate generally cylindrical struts having noncircular cross-sections, an electrical component having noncircular apertures therein corresponding to the cross-section of said struts and receiving said struts, each of said struts having a transverse groove therein generally aligned with said component, and each of said struts being in a rotational position about its axis such that said component is locked in said grooves.

12. The component assembly of claim 11 wherein the cross-section of the struts in said grooves is substantially circular.

13. The component assembly of claim 12 wherein said struts are rotatable about the axes of said substantially circular cross-sections.

14. The component assembly of claim 11 including a plurality of components, each having said noncircular apertures, and said struts being grooved to receive them.

References Cited

UNITED STATES PATENTS 3,248,490 4/1966 Allison et al. -------- 200—14

ROBERT K. SCHAEFER, *Primary Examiner.*

J. R. SCOTT, *Assistant Examiner.*